United States Patent [19]
Cohen

[11] 3,967,866
[45] July 6, 1976

[54] ANTI-FRICTION PRESSURE SEAL

[75] Inventor: William A. Cohen, Brooklyn, N.Y.

[73] Assignee: Sphero International Company, West Long Branch, N.J.

[22] Filed: June 9, 1975

[21] Appl. No.: 584,770

[52] U.S. Cl.......................... 308/187.1; 308/184 R; 308/207 R; 308/216
[51] Int. Cl.²..................... F16C 19/04; F16C 33/64
[58] Field of Search............. 308/187.1, 217, 184 R, 308/184 A, 187, 187.2, 216, 109, 110, 126, 207 R

[56] References Cited
UNITED STATES PATENTS

| | | | |
|---|---|---|---|
| 2,028,964 | 1/1936 | Annen | 308/184 R |
| 3,513,480 | 5/1970 | Robinson | 308/184 R |
| 3,640,591 | 2/1972 | Eklund | 308/184 R |
| 3,653,731 | 4/1972 | Rau | 308/184 R |

*Primary Examiner*—M. H. Wood, Jr.
*Assistant Examiner*—Richard A. Bertsch

[57] ABSTRACT

Means are provided for forming an anti-friction pressure seal between a surface and an element movable relative to that surface such that a fluid containing compartment may be divided into zones of different pressures. The seal includes a roller bearing, at least partially received within a cavity in the element, and a spring deformable to be positioned within the cavity between the roller bearing and the walls of the cavity. The spring has a first surface surrounding at least substantially half of the circumference of the bearing to retain the bearing in the cavity. The first surface, when the spring is inserted into the cavity, contacts the roller bearing substantially at only a single location between, but not including, the end sections thereof and substantially all other portions of the first surface are spaced from the roller bearing to minimize contact between the surface and the bearing. A second surface spaced from the first surface is adjacent the wall of the cavity when the spring is inserted into the cavity. Further, resilient means extending between the first and second surfaces are provided within the vicinity of the point of contact between the first surface and the roller bearing.

16 Claims, 6 Drawing Figures

ANTI-FRICTION PRESSURE SEAL

The present invention relates to fluid seals and in particular to a rolling pressure seal which utilizes a unique spring which substantially reduces frictional resistance between relatively moving bodies, the line of contact therebetween dividing a fluid containing compartment into zones of different pressures to form the seal.

Many instances arise in mechanical apparatus of a variety of types wherein a surface, which may have an irregular shape, defines a fluid containing compartment. An element which is designed to be movable relative to the irregular shaped surface contacts the surface such that the compartment is divided into two zones of different fluid pressure. The movement of this element may, for instance, be utilized to compress the fluid in the zone which lies in the direction of movement of the element. An example of such a situation is the compression chamber of certain specially designed internal combustion engines.

Such a system may be required to develop a relatively large fluid pressure on the compression side of the moving element. Obviously, in order to develop such a pressure, it is necessary that an effective pressure seal be maintained between the moving element and the stationary surface along the line of contact therebetween and thus between the zones of different fluid pressure.

It is conventional, in such situations, to utilize a spring loaded metal strip with a semi-circular rounded edge inserted in the apex of the moving element which rubs against the irregular shaped stationary surface making a single line contact between the moving pressure strip and the stationary surface. However, such a configuration has an inherent drawback in that it requires a tradeoff between the effectiveness of the seal and the amount of frictional resistance developed between the relatively moving bodies. If the moving metal strip is spring loaded to a relatively small extent, the frictional resistance to the rubbing action and the wearing of the relatively moving surfaces is minimized. However, the fluid under high pressure in one compartment leaks past the single line of contact into the adjacent compartment containing fluid under pressure and thus the seal is relatively inefficient. On the other hand, if the spring loading behind the moving seal strip is made very high in order to prevent leakage, then the frictional resistance and the wearing of the relatively moving surfaces becomes excessive causing early failure and, in some instances, marks of wear in typical corrugated patterns appear on the stationary surface. Thus, with conventional methods, a compromise must be made between the amount of pressure applied to the seal strip and the degree of leakage that can be tolerated across the seal.

It is, therefore, a prime object of the present invention to provide an anti-friction pressure seal which can provide an efficient pressure seal between two fluid zones of different pressures divided by an element moving relative to a surface without creating substantial frictional resistance at the line of contact.

It is a further object of the present invention to provide an anti-friction pressure seal which comprises a spring with a first surface surrounding at least substantially half of the circumference of a bearing such that the bearing is retained within a cavity in an element moving relative to a surface defining a fluid compartment.

It is a further object of the present invention to provide an anti-friction pressure seal having a spring with a first surface which contacts the bearing substantially only at a single location between but not including the end sections thereof, substantially all other portions of the first surface between the end sections thereof being spaced from the bearing in order to minimize the frictional resistance thereof.

It is still another object of the present invention to provide an anti-friction pressure seal having a spring with a second surface which is spaced from the first surface and situated adjacent the walls of the cavity when the spring is inserted in the cavity.

It is a still further object of the present invention to provide an anti-friction pressure seal comprising resilient means which extend between the first and second spaced surfaces of the spring in the vicinity of the location where the bearing contacts the spring to provide the spring with additional structural rigidity at that point.

In accordance with the present invention, means are provided for forming an anti-friction pressure seal between a surface defining a fluid containing compartment and an element movable relative thereto and contacting the surface along a line which divides the fluid containing compartment into zones of different fluid pressure. The means comprises a roller bearing which is at least partially received within a cavity situated in the element along the line of contact. A spring deformable to be positioned within the cavity between the roller bearing and the walls of the cavity includes a first surface surrounding at least substantially half of the circumference of the bearing to retain the bearing within the cavity.

The first surface, when the spring is inserted into the cavity, contacts the bearing substantially at only a single location between but not including the end sections thereof. Substantially all other portions of the first surface between but not including the end sections thereof are spaced from the bearing. In this manner, the frictional resistance between the roller bearing and the spring is minimized by substantially reducing the area of contact between these two relatively moving bodies.

A second surface is spaced from the first surface and situated adjacent to the wall of the cavity when the spring is inserted therein. Resilient means extending between the first and second surfaces in the vicinity of the location of contact between the bearing and the spring provides the spring with additional structural rigidity at the area of contact.

The second surface is divided into first and second separated parts to permit expansion thereof during insertion of the spring within the cavity. Each part is preferably integral with a different end of the first surface. The resilient means comprise a pair of substantially "S" shaped members, each of which is integrally formed on the end of a different one of the first and second separated parts. In this manner, the bearing surface may be continuously lubricated such that friction between the roller bearing and the first spring surface, as well as between the roller bearing and the stationary surface, is minimized.

The bearing of the present invention may be a conventional cylindrical roller bearing of the well-known type. In this instance, the spring which holds the bearing will be formed to have a uniform cross-sectional dimension. However, there are instances wherein the moving element, for instance, may be oscillating in the path of a circular arc and the bearing rolls against the side walls of an enclosed chamber having a rectangular or trapezoidal cross-section. In this case, the bearing will have a conical shape which will taper to a point at the center of the circular arc defined by the moving element. The pressure spring and the cavity into which it is inserted must, therefore, also be tapered in order to coincide with the shape of the bearing.

To these and such other objects as may hereinafter appear, the present invention relates to an anti-friction pressure seal as set forth in the appended claims and as described in the specification taken together with the accompanying drawings wherein like numerals refer to like parts and in which:

Figure 1:
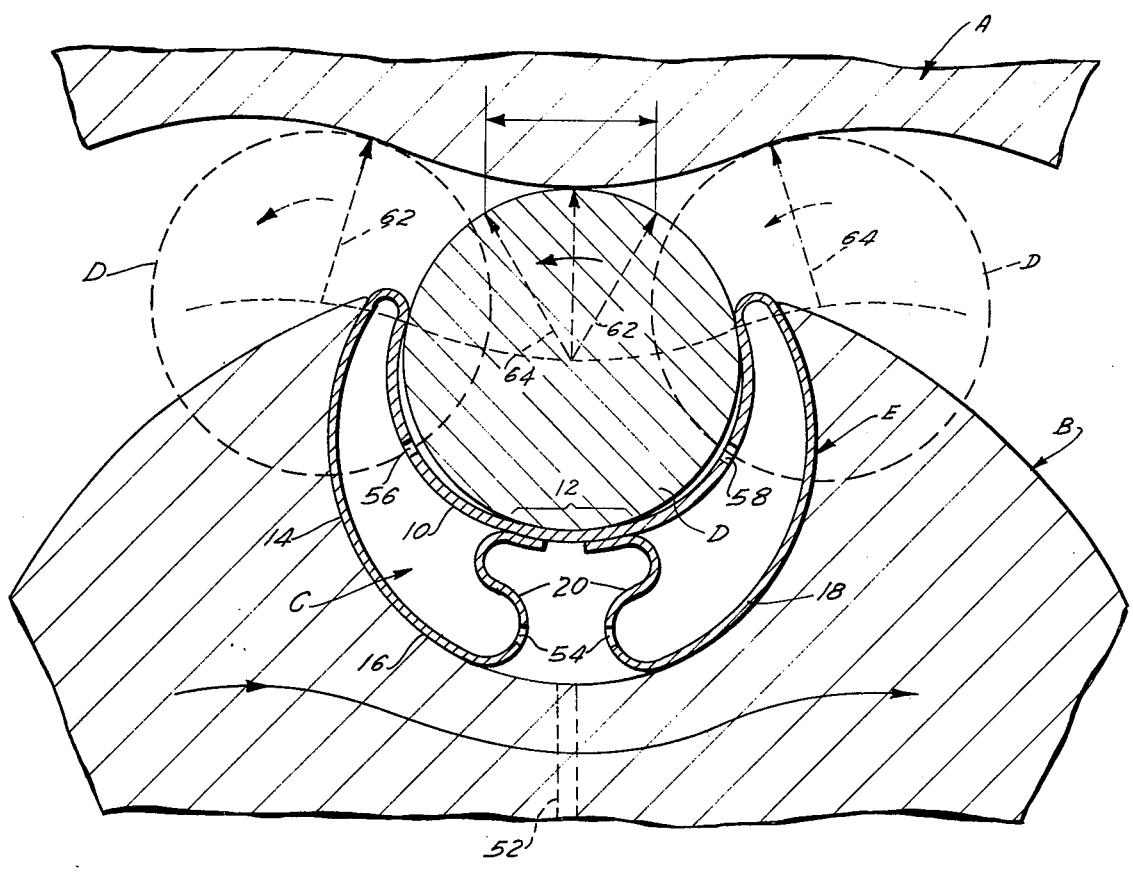
FIG. 1 is a cross-sectional view of the anti-friction pressure seal of the present invention.

As shown in FIG. 1, the present invention is an anti-friction pressure seal formed between a stationary surface, generally designated A, which may have an irregular or undulating surface, defining a compartment in which a fluid is situated. An element, generally designated B, is movable relative to surface A and the line of contact therebetween divides the fluid compartment into zones of different fluid pressures.

A cavity, generally designated C, is formed within element B. A spring, generally designated E, is deformable to be inserted within the cavity C, and into which the roller bearing, generally designated D, is inserted.

Figure 2:
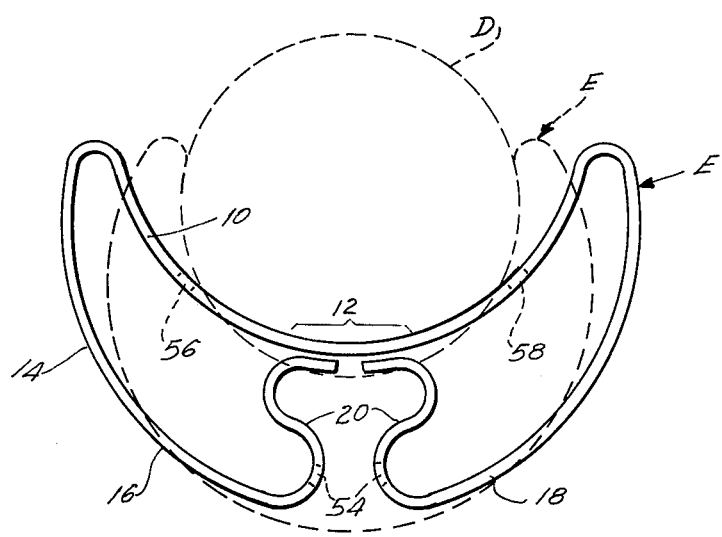
FIG. 2 is a side view of the spring of the present invention showing the spring in its non-deformed and deformed state.

FIG. 2 shows spring E in its expanded or undeformed position, and the relationship between this position and its deformed (shown in phantom) position which it takes when it is inserted within the cavity. Spring E comprises a first surface 10 which is longer than one-half the circumference of the bearing. Thus, when the bearing is inserted therein, first surface 10 surrounds at least substantially half of the circumference of the bearing to assure that the bearing will be retained within the cavity. The end sections of first surface 10 will, therefore, after insertion of the spring into the cavity, always be spaced apart a distance which is less than the diameter of the bearing D.

In addition, as best seen in FIG. 1, bearing D, when the spring is inserted into the cavity, contacts the surface 10 substantially at only a single location 12 thereon between but not including the end sections thereof. This is because the remaining portions of surface 10 are bowed outwardly slightly from the surface of bearing D and thus are slightly spaced therefrom. In this manner, the surface contact area between surface 10 and the surface of bearing D is minimized substantially thereby significantly reducing the frictional resistance developed therebetween.

Spring E is provided with a second surface 14 which is spaced from surface 10 and situated adjacent the walls of cavity C when the spring is inserted therein. Surface 14 is divided into separated parts 16, 18 to permit expansion of surface 14 during insertion of the spring into the cavity. Each of the separated parts 16, 18 is preferably integral with one of the ends of surface 10.

The spring is also provided with resilient means 20 extending between surface 10 and surface 14 in the vicinity of location 12 in order to provide additional structural rigidity. Resilient means 20 comprises a pair of substantially S shaped members, each of which is preferably integrally formed on the end of one of the separated parts 16, 18. In this manner, the spring E may be formed of a single sheet of appropriate material which is then fashioned into the desired shape.

In FIG. 1, bearing D is shown in phantom in its two extreme positions wherein the force vectors, as represented by dashed vector lines 62, 64, are shown to denote the maximum angle of force application between the surface of the roller bearing D and surface A. Lines 62 and 64, therefore, define the maximum sector of the cross-section of bearing D upon which the bearing D exerts force upon surface A. If one were to extend lines 62 and 64 to form diameters, it could be seen that section 12 of surface 10 basically coincides with that portion of the circumference of the surface of bearing D which falls between these lines. It is, therefore, this portion of surface 10 which reequires the greatest structural rigidity because the force applied by spring E will be greatest in this area. Resilient means 20 provide extra rigidity in this limited area, instead of through surface 10, such that the frictional resistance between the surface of roller bearing D and spring surface 10 is minimized.

Figure 3:
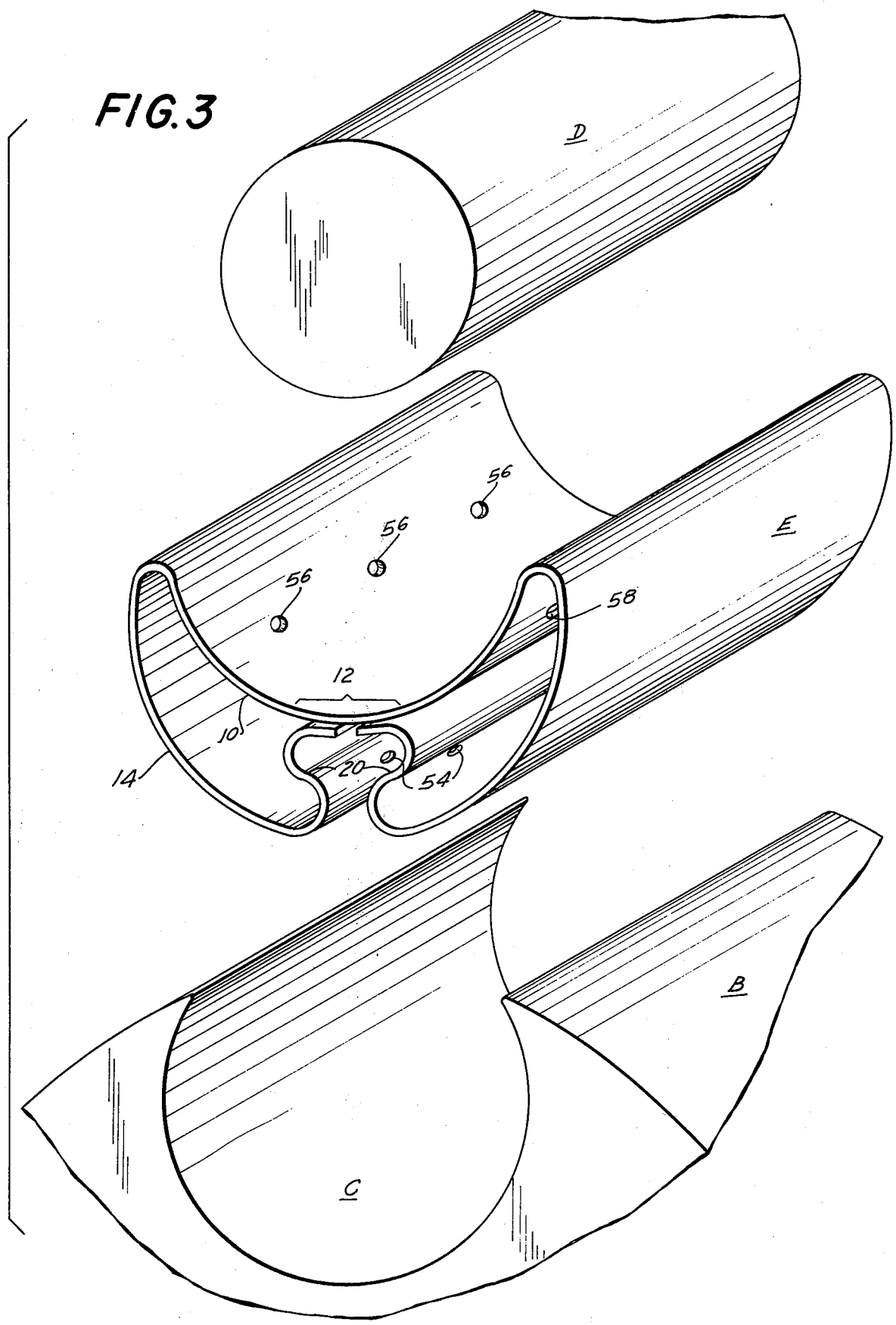
FIG. 3 is an exploded isometric view of the pressure seal of the present invention.

As shown in FIG. 3, the bearing D may be a conventional cylindrical roller bearing. In this instance, the cavity C will be cylindrically shaped and spring E will have a uniform cross-sectional dimension such that it coincides with the configuration with cavity C and bearing D. However, as shown in FIGS. 4, 5 and 6, there are instances in which it is preferable to fashion the bearing in a conical shape and thus cavity C and spring E must be accordingly tapered to coincide with the shape of the bearing.

In my co-pending application Ser. No. 556,707, filed Mar. 10, 1975, entitled ANTI-POLLUTANT SPHERICAL ROTARY ENGINE WITH AUTOMATIC SUPERCHARGER, a moving element oscillates in the path of a circular arc between the walls of a member defining a pair of compression chambers. The element is an enclosed conduit having a rectangular or trapezoidal cross-section through which fresh air is alternately fed to the compression chambers on each side thereof. Because of the circular path of the conduit, the bearings are conical in shape and tapered to a point at the center of the circular arc defined by the moving element so that a pressure seal is formed between the bearing and the side walls of the conduit. In this instance, the cavity into which the bearing is inserted and the spring must be tapered in conjunction with the shape of the bearing.

Figure 4:
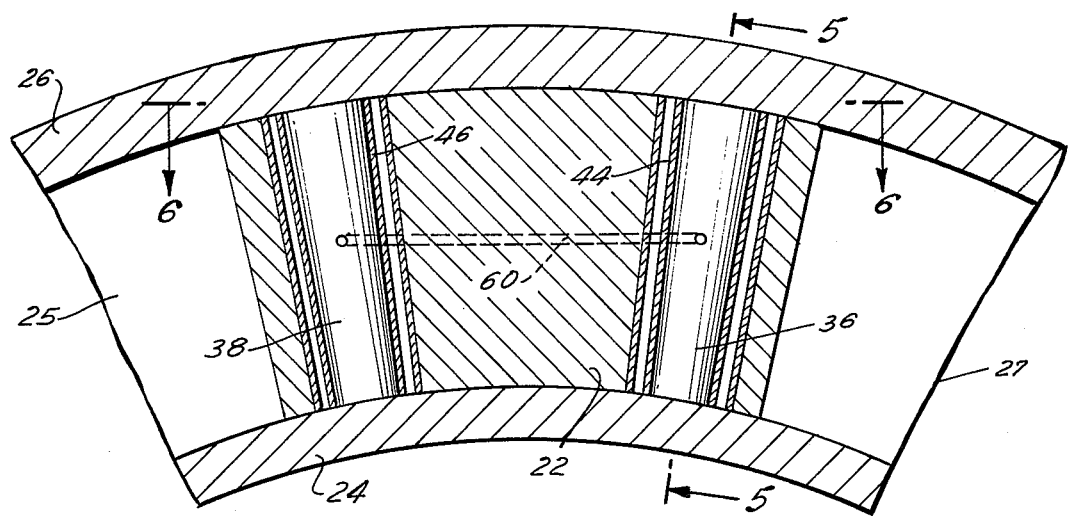
FIG. 4 is a top view of a second preferred embodiment of the present invention.
Figure 5:
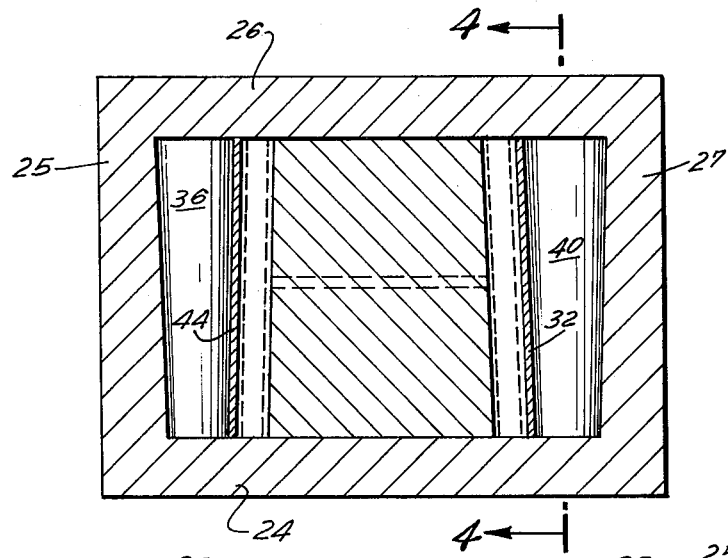
FIG. 5 is a side view taken along line 5—5 of the second preferred embodiment shown in FIG. 4.
Figure 6:
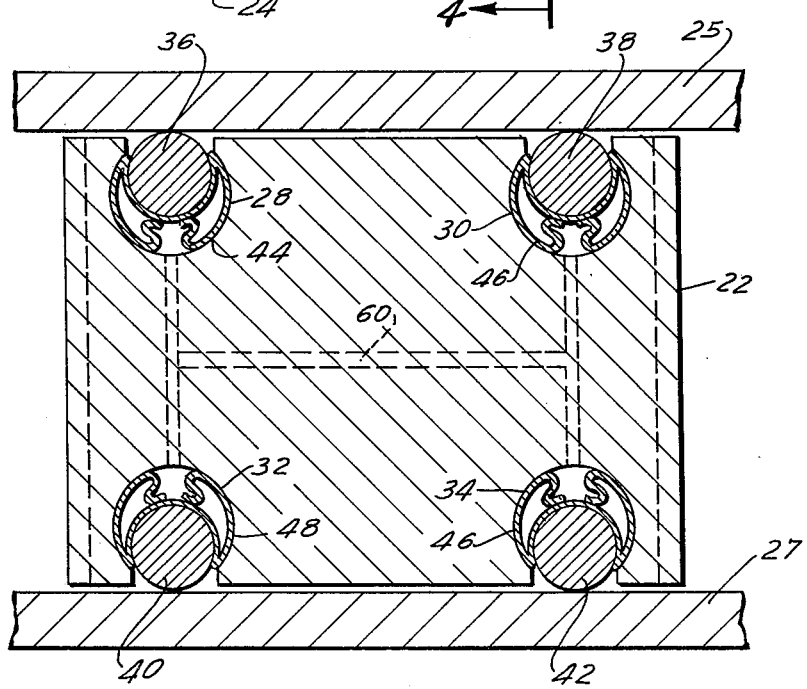
FIG. 6 is a top view taken along line 6—6 of the second preferred embodiment shown in FIG. 4.

Referring to FIGS. 4, 5 and 6, the moving element 22, having a rectangular cross-section is movable in a circular arc between a pair of concentric circular curved walls 24, 26 and upstanding semi-circular walls 25, 27. Within element 22 are four cavities 28, 30, 32 and 34 into which tapered bearings 36, 38, 40 and 42, respectively, are received. Between each of the bearings 36, 38, 40 and 42 and the respective cavity walls is situated a spring 44, 46, 48, 50 of the present invention. Each of the bearing and spring combinations forms an anti-friction pressure seal. In this manner, fluid is confined in the compartment defined by the walls on each side of moving body 22 such that the compartments are completely isolated from each other, even when the pressure in one of the compartments becomes relatively high as compared to that in the other compartment. It should also be noted that four additional non-tapered roller bearings, two on the top concave surface and two on the bottom convex surface of element 22 could be included, if desired, to completely seal all four sides of element 22. These bearings have, however, been omitted from the drawing for simplicity.

Referring again to FIG. 1, a lubricant conduit 52 is in communication with a lubricant source (not shown) which provides lubricant to cavity C. Each of the resilient means 20 is provided with a lubricant aperture 54 such that the lubricant enters the space between surface 10 and the surface 16 on one side of the resilient means and surface 10 and surface 18 on the other side thereof. In each of these spaces, the lubricant collects to form a reservoir. Surface 10 is provided with apertures 56, 58 which permit the lubricant to pass from the respective reservoirs to the space between surface 10 and the surface of roller bearing D. Thus, lubricant is provided to lubricate the surface of bearing D to further minimize the friction between this surface and surface 10 of spring E, as well as the roller bearing surface and surface A.

In the second embodiment, lubricant conduit 60, as shown in FIGS. 4, 5 and 6, provides lubricant to each of the cavities 28, 30, 32 and 34 which in the precise manner as described with respect to FIG. 1, lubricates the surfaces of bearings 36, 38, 40 and 42.

It can, therefore, be seen that the present invention is an anti-friction pressure seal which achieves an effective seal between a wall having an irregular surface defining a fluid compartment and an element movable relative thereto which divides the compartment into the zones of different fluid pressure. The effective seal is, however formed in a manner which greatly minimizes the frictional resistance between the relatively moving parts thus substantially eliminating wear between these parts and enhancing the operational life of the seal. Further, the spring may be fashioned from a single sheet of appropriate material, thus minimizing the cost thereof. In addition, assembly of the bearing and the spring into the cavity requires a minimal amount of time and expense because of the snap fit of the spring and bearing into the cavity.

While only two preferred embodiments of the present invention have been described herein for purposes of illustration, it is obvious that many modifications and variations thereof may be possible. It is intended to cover all of these variations and modifications which fall within the scope of the invention as defined by the appended claims.

What is claimed is:

1. In combination, for use with an element having a cavity therein, a roller bearing at least partially received within said cavity and a spring deformable to be inserted within said cavity between said roller bearing and the walls of said cavity, said spring comprising a first part surrounding at least substantially half of the circumference of said roller bearing, said first part, when said spring is inserted into said cavity, contacting said roller bearing, substantially at only a single location between but not including said end sections thereof, substantially all other portions of said first part between but not including the end sections thereof being spaced from said roller bearing, a second part spaced from said first part and adjacent the wall of said cavity when said spring is inserted in the said cavity, and resilient means extending between said first and said second parts in the vicinity of said location in order to maintain the spacing between said parts.

2. The combination of claim 1 wherein the end sections of said first part, when said spring is positioned within said cavity, are spaced apart a distance less than the diameter of said bearing.

3. The combination of claim 1 wherein said roller bearing is cylindrical.

4. The combination of claim 1 wherein said roller bearing is tapered and said spring is likewise tapered to substantially coincide with the shape of said bearing.

5. Anti-friction means for forming a pressure seal between a surface and an element movable relative thereto dividing a fluid containing compartment into zones of different pressures comprising a roller bearing at least partially received within the cavity in said element and a spring deformable to be positioned within the cavity between the roller bearing and the walls of said cavity, said spring comprising a first surface surrounding at least substantially half of the circumference of said bearing, said first surface, when said spring is inserted into said cavity contacting said roller bearing substantially at only a single location between, but not including, said end sections thereof, substantially all other portions of said first surface between, but not including, the end sections thereof being spaced from said roller bearing, a second surface spaced from said first surface and adjacent the wall of said cavity when said spring is inserted in the said cavity, and resilient means extending between said first and said second surfaces in the vicinity of said location.

6. The anti-friction means of claim 5 further comprising a lubricant reservoir and an aperture connecting said reservoir and a portion of said first surface spaced from said bearing.

7. The anti-friction means of claim 5 wherein said bearing is cylindrical.

8. The anti-friction means of claim 5 wherein said bearing is tapered and said spring is likewise tapered to substantially coincide with the shape of said bearing.

9. The anti-friction means of claim 5 wherein the end sections of said first surface, when said spring is positioned within said cavity, are spaced apart a distance less than the diameter of said bearing.

10. The anti-friction means of claim 5 wherein said second surface is divided into first and second separated parts to permit expansion thereof during insertion of said spring within said cavity.

11. The anti-friction means of claim 10 wherein each of said parts is integral with a different end of said first surfaces.

12. The anti-friction means of claim 10 wherein said resilient means comprises a pair of substantially S shaped members, each of which is integrally formed on the end of a different one of said parts.

13. In combination, for use with an element having a cavity therein, a roller bearing at least partially received within said cavity and a spring deformable to be inserted within said cavity between said roller bearing and the walls of said cavity, said spring comprising a first surface surrounding at least substantially half of the circumference of said roller bearing, said first surface, when said spring is inserted into said cavity, contacting said roller bearing substantially at only a single location between, but not including, said end sections thereof, substantially all portions of said first surface between, but not including, the end sections thereof being spaced from said roller bearing, a second surface spaced from said first surface and adjacent the wall of said cavity when said spring is inserted in the said cavity, said second surface being divided into first and second separate parts to permit expansion thereof during insertion of said spring within said cavity, and resilient means extending between said first and second surfaces in the vicinity of said location.

14. The combination of claim 13 wherein each of said parts is integral with a different end section of said first surfaces.

15. The combination of claim 13 wherein said resilient means comprises a pair of substantially S shaped members, each of which is integrally formed on the end of a different one of said parts.

16. In combination, for use with an element having a cavity therein, a roller bearing at least partially received within said cavity and a spring deformable to be inserted within said cavity between said roller bearing and the walls of said cavity, said spring comprising a first surface surrounding at least substantially half of the circumference of said roller bearing, said first surface, when said spring is inserted into said cavity, contacting said roller bearing substantially at only a single location between, but not including, said end sections thereof, substantially all other portions of said first surface between, but not including, the end sections thereof being spaced from said roller bearing, a second surface spaced from said first surface and adjacent the wall of said cavity when said spring is inserted in the said cavity, and resilient means extending between said first and said second surfaces in the vicinity of said location, a lubricant reservoir and an aperture connecting said reservoir and a portion of said first surface spaced from said roller bearing.

* * * * *